US011015507B2

(12) United States Patent
Gaiser

(10) Patent No.: US 11,015,507 B2
(45) Date of Patent: May 25, 2021

(54) EXHAUST GAS/REACTANT MIXING ASSEMBLY UNIT

(71) Applicant: Eberspächer Exhaust Technology GmbH & Co. KG, Neunkirchen (DE)

(72) Inventor: Gerd Gaiser, Reutlingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 0 days.

(21) Appl. No.: 16/160,086

(22) Filed: Oct. 15, 2018

(65) Prior Publication Data

US 2019/0112961 A1 Apr. 18, 2019

(30) Foreign Application Priority Data

Oct. 16, 2017 (DE) .................. 10 2017 124 032

(51) Int. Cl.
*F01N 3/20* (2006.01)
*F01N 3/28* (2006.01)
(Continued)

(52) U.S. Cl.
CPC ......... *F01N 3/2892* (2013.01); *F01N 3/2066* (2013.01); *F01N 13/009* (2014.06);
(Continued)

(58) Field of Classification Search
CPC .... B01F 3/04049; B01F 5/0451; B01F 5/061; F01N 3/2066; F01N 3/2892;
(Continued)

(56) References Cited

U.S. PATENT DOCUMENTS 6,312,650 B1 * 11/2001 Frederiksen ....... B01D 53/9431
181/264
6,444,177 B1 * 9/2002 Muller ............... B01D 53/8631
422/177
(Continued)

FOREIGN PATENT DOCUMENTS

CN 106030063 A 10/2006
CN 102071994 A 5/2011
(Continued)

*Primary Examiner* — Matthew T Largi
(74) *Attorney, Agent, or Firm* — McGlew and Tuttle, P.C.

(57) ABSTRACT

An internal combustion engine, exhaust system, exhaust gas/reactant mixing assembly unit includes an inlet area (14) of an exhaust gas flow duct (12) and a reactant release device (20) releasing reactant (R) into exhaust gas (A) flowing in the exhaust gas flow duct. The exhaust gas flow duct includes a mixing section (16) with a first mixing section segment (22) downstream of the reactant release device (20). An exhaust gas/reactant mixture flows in the first mixing section segment essentially in a main flow direction (H1)— from the reactant release device to a deflection area. A ring-shaped second mixing section segment (28) surrounds the first mixing section segment. The exhaust gas/reactant mixture flows in the second mixing section segment (28) in a second main flow direction (H2), essentially opposite the first main flow direction, from the deflection area (26) to an outlet area (34) of the exhaust gas flow duct (12).

20 Claims, 3 Drawing Sheets

(51) Int. Cl.
*F01N 13/14* (2010.01)
*F01N 13/00* (2010.01)

(52) U.S. Cl.
CPC .......... *F01N 13/14* (2013.01); *F01N 2240/20* (2013.01); *F01N 2470/08* (2013.01); *F01N 2470/18* (2013.01); *F01N 2470/22* (2013.01); *F01N 2470/24* (2013.01); *F01N 2490/06* (2013.01); *F01N 2610/02* (2013.01); *F01N 2610/1453* (2013.01)

(58) Field of Classification Search
CPC .... F01N 13/009; F01N 13/14; F01N 2240/20; F01N 2470/08; F01N 2470/18; F01N 2470/22; F01N 2470/24; F01N 2490/06; F01N 2610/02; F01N 2610/1453
See application file for complete search history.

(56) References Cited

U.S. PATENT DOCUMENTS

| | | | | |
|---|---|---|---|---|
| 8,499,548 | B2* | 8/2013 | De Rudder | F01N 3/2066 60/286 |
| 2002/0187093 | A1 | 12/2002 | Muller et al. | |
| 2003/0017086 | A1* | 1/2003 | Bruck | F01N 3/2006 422/168 |
| 2006/0008397 | A1* | 1/2006 | Bruck | F01N 3/0231 422/180 |
| 2006/0266022 | A1* | 11/2006 | Woerner | F01N 1/08 60/295 |
| 2010/0139258 | A1* | 6/2010 | Hackett | F01N 3/2066 60/299 |
| 2010/0290957 | A1* | 11/2010 | Yoshida | F01N 3/106 422/109 |
| 2011/0058999 | A1* | 3/2011 | Ettireddy | B01J 37/0244 423/213.5 |
| 2013/0174537 | A1* | 7/2013 | Loman | B01F 5/045 60/310 |
| 2014/0026540 | A1* | 1/2014 | Beyer | F01N 3/20 60/273 |
| 2014/0311133 | A1* | 10/2014 | Norling | B01F 5/0659 60/286 |
| 2015/0037219 | A1* | 2/2015 | Moran | F01N 3/103 422/171 |
| 2017/0254244 | A1 | 9/2017 | Kurpejovic et al. | |

FOREIGN PATENT DOCUMENTS

| | | | |
|---|---|---|---|
| CN | 102301101 A | 12/2011 | |
| CN | 106014580 A | 10/2016 | |
| CN | 107152327 A | 9/2017 | |
| DE | 697 04 351 T2 | 12/2001 | |
| DE | 10 2009 036 511 A1 | 2/2011 | |
| DE | 10 2013 210 799 A1 | 12/2014 | |
| DE | 10 2015 122 009 A1 | 6/2017 | |
| DE | 10 2016 201 557 B3 | 6/2017 | |
| EP | 2 813 679 A1 | 12/2014 | |
| EP | 2 761 148 B1 | 5/2017 | |
| JP | 2006017043 A | 1/2006 | |
| JP | 2006017043 A * | 1/2006 | ............ B01D 53/90 |
| WO | 97/01387 A1 | 1/1997 | |
| WO | 2013/048309 A1 | 4/2013 | |
| WO | 2014/107129 A1 | 7/2014 | |

* cited by examiner

EXHAUST GAS/REACTANT MIXING ASSEMBLY UNIT

CROSS REFERENCE TO RELATED APPLICATIONS

This application claims the benefit of priority under 35 U.S.C. § 119 of German Application 10 2017 124 032.2, filed Oct. 16, 2017, the entire contents of which are incorporated herein by reference.

FIELD

The present invention pertains to an exhaust gas/reactant mixing assembly unit for an exhaust system of an internal combustion engine, for example, in a vehicle

BACKGROUND

It is known that a reactant, for example, a urea/water solution, may be added to the exhaust gas discharged by the internal combustion engine to reduce the pollutant emission, especially the nitrogen oxide emission, of an internal combustion engine, especially of a diesel internal combustion engine, in order to lower the percentage of the harmful nitrogen oxide in the exhaust gas in a catalytic reduction carried out in an SCR (selective catalytic reduction) catalytic converter unit. The reactant added to the exhaust gas, i.e., for example, the urea/water solution, is decomposed in a mixing section downstream of a reactant release device and upstream of the SCR catalytic converter unit, so that ammonia necessary for the catalytic reaction is produced. The quantity of water contained in the solution is evaporated in the course of this decomposition and ammonia is generated from the urea in a thermal decomposition. In addition to water and ammonia, isocyanic acid is also formed during this thermal decomposition, and it is reacted catalytically in a hydrolysis reaction with water to form ammonia.

To guarantee efficient generation of ammonia from the reactant and efficient mixing of the reactant or of the substances generated therefrom with the exhaust gas discharged by an internal combustion engine especially also under unfavorable thermal conditions, i.e., at comparatively low ambient or operating temperatures, and at high metering rates of the reactant, it is necessary to provide a sufficiently long mixing section between the point at which the reactant is introduced and the SCR catalytic converter unit. A mixing element with a plurality of guide blades generating a swirl may also be provided to support the mixing in the mixing section. It is problematic in this connection that especially in vehicles, the space available for the installation of such exhaust systems is limited. It is possible, for example, to select a U-shaped configuration for such a mixing section for an efficient utilization of the space available for installation, so that the mixing section has two juxtaposed mixing section segments.

SUMMARY OF THE INVENTION

An object of the present invention is to provide an exhaust gas/reactant mixing assembly unit, which, having a compact design, guarantees efficient mixing of exhaust gas and reactant and of substances formed from the reactant.

This object is accomplished according to the present invention by an exhaust gas/reactant mixing assembly unit for an exhaust system of an internal combustion engine, comprising an inlet area of an exhaust gas flow duct and a reactant release device for releasing reactant into exhaust gas flowing in the exhaust gas flow duct, wherein the exhaust gas flow duct comprises a mixing section with a first mixing section segment downstream of the reactant release device, wherein an exhaust gas/reactant mixture flows in the first mixing section segment essentially in a first main flow direction in the direction from the reactant release device to a deflection area, and a second mixing section segment, wherein the second mixing section segment surrounds the first mixing section segment in an essentially ring-shaped manner (a ring shaped configuration), and the exhaust gas/reactant mixture flows in the second mixing section segment in a second main flow direction essentially opposite the first main flow direction from the deflection area to an outlet area of the exhaust gas flow duct.

Due to the nesting according to the present invention of two mixing section segments according to the present invention and the essentially coaxial flow arrangement generated thereby, the space necessary for the installation of the mixing section is, on the one hand, limited. On the other hand, the coaxial flow guiding with the second mixing section segment being arranged surrounding the first mixing section segment makes possible a markedly better utilization of the heat being transported in the exhaust gas for the evaporation and the thermal decomposition of the reactant and of components thereof.

In an embodiment that is especially advantageous in respect to the heat transfer to the reactant, a first ring wall is provided, which extends in the first main flow direction, defines the first mixing section segment in relation to the first main flow direction radially to the outside, and separates this from the second section segment. The first ring wall is heated not only on its inner side by the exhaust gas flowing there, but also on its outer side by the exhaust gas flowing in the second mixing section segment.

The first ring wall may have a cylindrical configuration essentially in the entire area of its longitudinal extension in the direction of the first main flow direction, so that uniform flow conditions can be ensured with a simple configuration.

Provisions may be made in an alternative embodiment for the first ring wall to be configured essentially conically in the entire area of its longitudinal extension in the direction of the first main flow direction with decreasing cross-sectional dimension, preferably wherein a slope angle of the first ring wall in relation to the first main flow direction is in the range of 1°-5° and preferably 1°-3°. On the one hand, intensified impingement of the reactant released, in general, in the form of a divergent spray cone into the exhaust gas stream on the first ring wall is guaranteed with such a configuration. Further, a gradual cooling and the associated reduction in the volume or an increase in the density of the exhaust gas stream can be taken into account by the decreasing flow cross section.

Further, a second ring wall may be provided, which extends in the second main flow direction and defines the second mixing section segment radially to the outside in relation to the second main flow direction.

The second ring wall may have a cylindrical configuration for a simple configuration essentially in the entire area of its longitudinal extension in the direction of the second main flow direction. Especially in connection with a decrease in the cross section of the first ring wall, this also ensures a flow cross section decreasing in the flow direction in the second mixing section segment.

Provisions may be made for the flow transition from the first mixing section segment to the second mixing section segment for the deflection area to comprise a deflecting element adjoining in its outer circumferential area the second ring wall.

To achieve uniform flow deflection and flow separation, it is proposed that the deflecting element have a deflecting surface curved preferably essentially rotationally symmetrically in relation to the central longitudinal axis.

Further, the deflection of the exhaust gas stream in the deflection area can be supported by at least one essentially ring-shaped guide element providing a curved deflecting surface being provided in the deflection area.

The evaporation and the thermal decomposition of the reactant can be supported, especially at low exhaust gas temperatures, by a preferably electrically energizable heating device being provided for heating a wall defining the exhaust gas duct, preferably in the deflection area.

Further, heat losses to the outside can be markedly reduced in an advantageous embodiment if a wall defining the mixing section to the outside is covered, preferably in the deflection area, with insulating material on a side facing away from the exhaust gas flow duct.

To make the flow transition between the two mixing section segments more uniform and to avoid flow separation in this area, in which the exhaust gas stream is deflected by about 180°, the first mixing section segment may be radially expanded in its end area located close to the deflection area in relation to the first main flow direction. As an alternative or in addition, provisions may be made for the first ring wall to be expanded in a bead-like manner (to have an expanding bead configuration) in its end area located close to the deflection area.

A compact configuration of an exhaust system equipped with an exhaust gas/reactant mixing assembly unit according to the present invention may be provided with the inlet area and the outlet area of the exhaust gas flow duct being arranged essentially in the same axial area of the mixing section in relation to the first main flow direction or/and the second main flow direction.

Since the flow volume is defined in the second section segment by a wall both radially inwardly and radially outwardly and thus a greater flow resistance prevails in this area for the exhaust gas flowing there than in the first mixing section segment, a flow cross-sectional area in the area of the second mixing section segment may be larger than or equal to the flow cross-sectional area in the area of the first mixing section segment.

Further, the mixing of exhaust gas and reactant can be supported especially in the first mixing section segment by the inlet area of the exhaust gas flow duct being formed in the first mixing section segment to generate a swirling flow.

The present invention further pertains to an exhaust gas treatment assembly unit for an exhaust system of an internal combustion engine, comprising an exhaust gas/reactant mixing assembly unit configured according to the present invention and at least one SCR catalytic converter unit downstream of the exhaust gas/reactant mixing assembly unit.

To support a compact design of such an exhaust gas treatment device, an inlet area of the at least one SCR catalytic converter unit and the outlet area of the exhaust gas flow duct of the exhaust gas/reactant mixing assembly unit may be located in the same axial area of the mixing section in relation to the first main flow direction or/and the second main flow direction.

Provisions may furthermore be made for the outlet area of the exhaust gas flow duct to open into an exhaust gas flow chamber guiding the exhaust gas/reactant mixture from the outlet area of the exhaust gas flow duct essentially radially to the outside in relation to the second main flow direction to the inlet area of the at least one SCR catalytic converter unit.

To increase the efficiency of the selective catalytic reduction to be carried out to purify the exhaust gas, the inlet areas of at least two SCR catalytic converter units may be open towards the releasing flow chamber.

Further, for an improved exhaust gas purification, an oxidation catalytic converter unit or/and a particle filter device may be provided upstream of the exhaust gas/reactant mixing assembly unit.

A compact design can also be supported in this area by an outlet area of the oxidation catalytic converter unit or/and of the particle filter device being open towards a receiving flow chamber and by the inlet area of the exhaust gas flow duct being open towards the receiving flow chamber, preferably wherein exhaust gas flows in the receiving flow chamber radially inwardly in relation to the first main flow direction, wherein the receiving flow chamber and the releasing flow chamber are arranged in the same axial area of the mixing section in relation to the first main flow direction or/and the second main flow direction.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
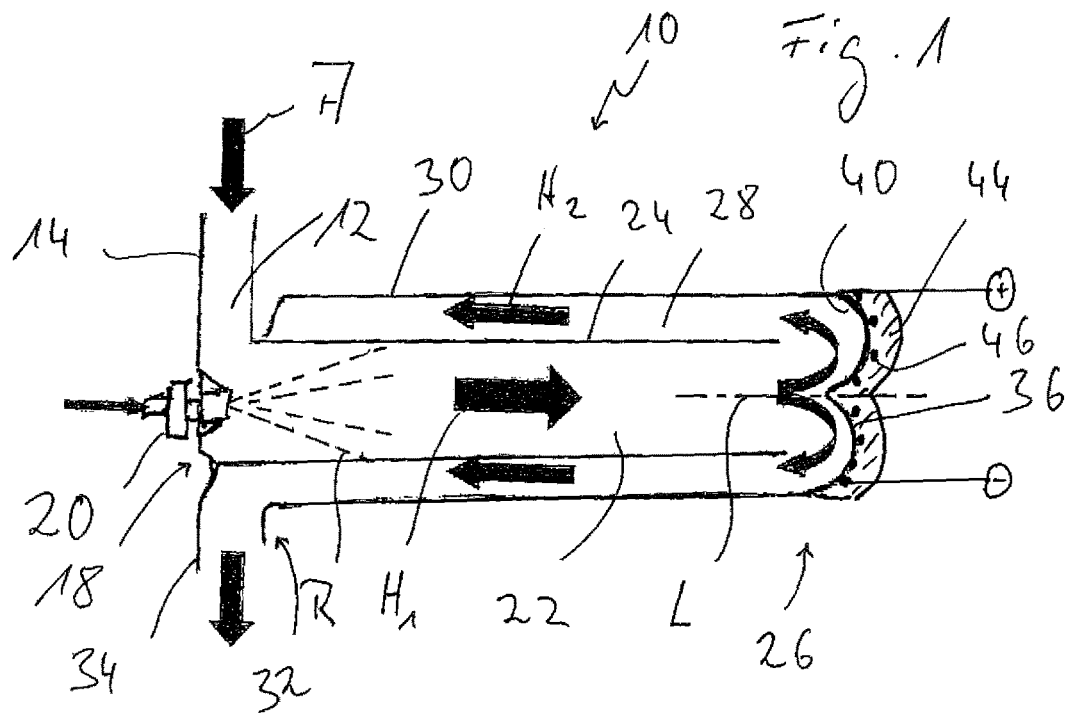
FIG. 1 is a schematic longitudinal sectional view of an exhaust gas/reactant mixing assembly unit.

Referring to the drawings, an exhaust gas/reactant mixing assembly unit for an exhaust system of an internal combustion engine, especially in a vehicle, is generally designated by 10 in FIG. 1. The exhaust gas/reactant mixing assembly unit 10 comprises an exhaust gas flow duct 12 with an inlet area 14. The inlet area 14 of the exhaust gas flow duct 12 guides the exhaust gas A discharged by an internal combustion engine in the direction of a mixing section generally designated by 16. A reactant release device 20, generally also called injector, is provided at an upstream end area 18 of the mixing section 16. The reactant release device 20 releases liquid reactant R, for example, a urea/water solution or the like, in the form of a spray cone into a first mixing section segment 22 of the mixing section 16. The first mixing section segment 22 is formed essentially in the interior of a first ring wall 24. The ring wall 24 is essentially tubular and has an elongated configuration in the direction of a central longitudinal axis L and has an essentially cylindrical shape in the exemplary embodiment shown in FIG. 1, so that the first mixing section segment 22 is configured with essentially the same cross-sectional area and cross-sectional shape essentially in the entire area of the longitudinal extension of the first ring wall 24.

The exhaust gas A introduced from the inlet area A into the first mixing section segment 22 is guided such that a swirling flow of the exhaust gas A develops in the first mixing section segment, as a result of which the mixing of exhaust gas A and reactant R in the first mixing section segment 22 is supported. The swirling flow may be generated, for example, by the exhaust gas A being introduced essentially radially from the inlet area 14 into the first mixing section segment 22, possibly also supported by guide elements supporting the deflection in the circumferential direction in the upstream end area 18 of the mixing section.

Regardless of whether and to what extent the exhaust gas A is introduced with a swirling flow into the first mixing section segment 22, the exhaust gas A or the mixture of exhaust gas A and reactant R, which is generated there, has a first main flow direction H1 in the first mixing section segment 22. This first main flow direction H1 may consequently correspond essentially to the direction in which the exhaust gas A flows or is delivered essentially linearly or with a helically wound flow path along the first ring wall 24 in the direction of a deflection area 26.

The exhaust gas stream mixed with reactant R is deflected by about 180° in the deflection area 26 and enters a second mixing section segment 28. This is defined radially inwardly by the first ring wall 24 and is defined radially outwardly by a second ring wall 30 surrounding the first ring wall 24, for example, essentially concentrically. The second mixing section segment 28 thus surrounds the first mixing section segment 22 essentially over the entire area of the longitudinal extension thereof in a ring-shaped manner, so that the mixture of exhaust gas A and reactant R flowing in the second mixing section segment 28 flows essentially in a second main flow direction H2, which is essentially opposite the first main flow direction H1. It should be noted here as well that the second main flow direction H2 indicates the flow direction in which the mixture of exhaust gas A and reactant R flowing in the second mixing section segment 28 flows or is delivered from the deflection area 26 in the direction of a downstream end area 32 of the mixing section 16 and to an outlet area 34 of the exhaust gas flow duct 12, which said outlet area 34 leads away there from the mixing section 16. The stream of exhaust gas A and reactant R may follow a, for example, helically wound flow path around the first ring 24 in the second mixing section segment 28 as well, which may result from the circumstance that the stream leaving the first mixing section segment 22 has such a flow direction component in the circumferential direction or/and that guide elements supporting such a flow guiding are provided in the second mixing section segment 28.

Figure 2:
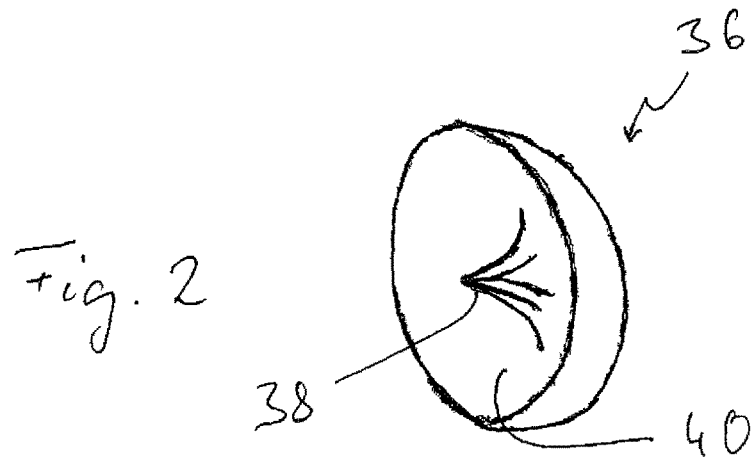
FIG. 2 is a perspective view of a deflecting element of the exhaust gas/reactant mixing assembly unit according to FIG. 1.

It is seen in FIG. 1 that the inlet area 14 and the outlet area 34 of the exhaust gas flow duct 12 are located approximately in the same axial area, namely, in the area of the upstream end area 18 and also of the downstream end area 32 of the mixing section 16 in relation to the two main flow directions H1, H2 and also in relation to the central longitudinal axis L, which corresponds essentially to these two main flow directions. The deflection area 26, which is formed essentially by a cap-shaped deflecting element 36, which is shown in FIG. 2 and is connected to the second ring wall 30, is provided at the other axial end area of the mixing section 16. Since the ring walls 24, 30 and also the deflecting element 36 are made, in general, from a metallic material for reasons of heat stability, the deflecting element 36 may be connected to the second ring wall 30, for example, by connection in substance, i.e., welding or soldering, but it also could optionally be made integrally therewith.

The deflecting element 36 may have, for example, a rotationally symmetrical shape in relation to the central longitudinal axis L and provide, starting from a central elevated area 38 oriented in the direction of the first mixing section segment 22, a deflecting surface 40, which surrounds the central longitudinal axis L in a ring-shaped manner and is curved in the manner of an arc from radially inwards to radially outwards. The mixture of exhaust gas A and reactant R leaving the first mixing section segment 22 reaches the deflecting element 36 and the deflecting surface 40 thereof and is deflected along the circular path of motion provided by the deflecting surface 40 radially outwardly and then in the direction of the second mixing section segment 28. A gradual deflection of the stream leaving the first mixing section segment 22 by about 180°, which prevents flow separation to the greatest extent possible, is thus achieved due to the deflecting surface 40 having an approximately circular or rounded course.

Figures 3A, 3B:
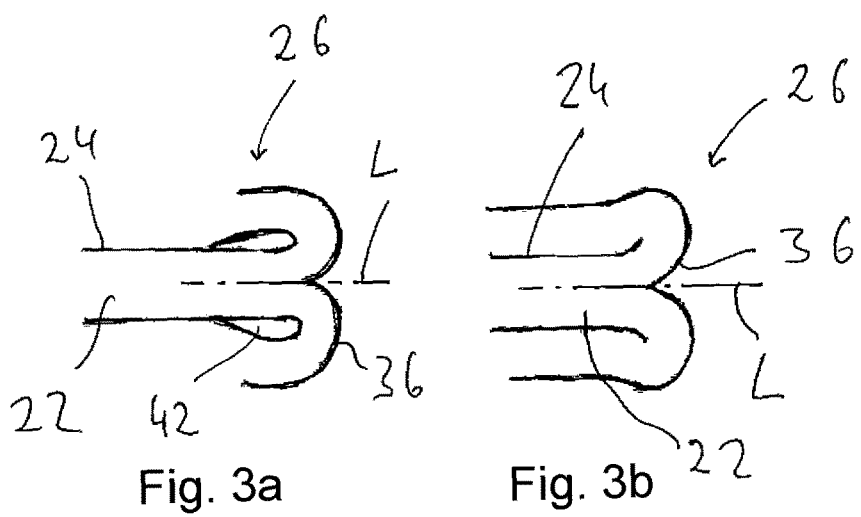
FIG. 3a is a schematic sectional view showing a differently configured deflection area of the exhaust gas/reactant mixing assembly unit according to FIG. 1.
FIG. 3b is a schematic sectional view showing a differently configured deflection area of the exhaust gas/reactant mixing assembly unit according to FIG. 1.

FIGS. 3a and 3b show alternative embodiments of the mixing section 16 for this especially in the deflection area 26. Thus, FIG. 3a shows an embodiment in which the first ring wall 24 ends with a bead-like (bead shaped) expansion 42 in its axial end area located close to the deflection area 26, so that the development of flow separation from the surface of the first ring wall 24 is also avoided in the radially inner flow area during deflection of the stream leaving the first mixing section segment 22. This is also supported by the fact that the first ring wall 24 or the first mixing section segment 22 has an expanding configuration in relation to the central longitudinal axis L in its end area located close to the deflection area 26 and to the deflecting element 36. A corresponding configuration is also shown in FIG. 3b, in which the first ring wall 24 expands radially outwardly in its axial end area located close to the deflection area 26 and thus supports a flow of the stream leaving the first mixing section segment 22, which flow follows a circular flow path, in the deflection area 26.

Various advantageous aspects are achieved with the configuration of an exhaust gas/reactant mixing assembly unit 10, which was described above with reference to FIGS. 1 through 3. On the one hand, a comparatively great flow length is obtained for the exhaust gas A mixed with reactant R with an axially limited overall length. This means that a correspondingly large surface of the two ring walls 24, 30 is available, which can be wetted with reactant and the evaporation and the thermal decomposition of the reactant R can thus efficiently be guaranteed. The thermal interaction of the reactant R with the components defining the flow path thereof is also improved by the comparatively hot exhaust gas flowing not only around the inner side of said ring wall 24 but also on the outer side thereof. This causes heat to be also transmitted to the first ring wall 24 in the area of the second mixing section segment 28, namely, from the exhaust gas flowing around this wall on the outer side thereof in the second mixing section segment 28. Thus, the first ring wall 24 absorbs heat not only on its inner surface facing the first mixing section segment 22, but also on its outer surface facing the second mixing section segment 28, which substantially supports the heating and the thermal decomposition of the reactant R especially in the first mixing section segment 22. Further, the release of heat to the outside is limited essentially to the length of the second mixing section segment 28 and of the second ring wall 30 defining this radially outwardly. Heat loss that cannot be utilized for the thermal decomposition of the reactant R and for the evaporation of water from the reactant R can thus occur in this area only as well as in the area of the deflection area 26. To minimize this effect, the mixing section may be covered by heat insulating material 44 on its outer side, as it is indicated, for example, in FIG. 1 in connection with the deflection area 26. This is embodied, for example, in the area of the deflecting element 36 in the example shown. It should be noted that in the sense of the present invention, such heat insulating material is a material that has a lower heat conductivity than the material of which the surrounding components, i.e., for example, the deflecting elements 36, are made. Further, an electrically energizable heating device 46 may be provided to support the evaporation and the thermal decomposition of the reactant R or of components thereof. This heating device 46, which is provided, for example, in the form of a heating coil or a sheet-type heating element, on the outside of a component, which component is the deflecting element 36 in the example shown, and which defines the mixing section 16 to the outside, heats the area of the mixing section 16, which said area interacts with it thermally. This is especially advantageous if this takes place, as is shown, in the area of the deflection area 26. Above all, larger drops of reactant R, released by the reactant release device 20 and carried by the exhaust gas stream, in the first mixing section segment 22, move primarily essentially in the first main flow direction H1 and thus partially not in thermal interaction with the inner surface of the first ring wall 24. Such droplets of reactant R impinge on the deflecting surface 40 of the deflecting element 36 and can burst there and be disintegrated, on the one hand, into smaller droplets and form a reactant film wetting the deflecting surface 40 of the mixing element 36. To achieve intensified thermal decomposition and evaporation in this area, it is advantageous to heat this area more intensely by the additional supply of heat. This is especially advantageous when comparatively high metering rates are used or/and when the temperature of the different components of the exhaust gas/reactant mixing assembly unit 10 is comparatively low, for example, during the start phase of an internal combustion engine or at comparatively low ambient temperatures.

To ensure in the case of the configuration of an exhaust gas/reactant mixing assembly unit 10 shown in FIG. 1 that the flow resistance in the first mixing section segment 22 and in the second mixing section segment 28 is approximately equal for the exhaust gas A and reactant R flowing in them, the flow cross-sectional area may be greater in the second mixing section segment 28 than in the first mixing section segment 22. The circumstance that the second mixing section segment 28 is defined by a surface both radially outwardly and radially inwardly and thus there is a markedly enlarged surface leading to the increase in the flow resistance compared to the first mixing section segment 22 is thus taken into account.

The compact design of the exhaust gas/reactant mixing assembly unit 10 is supported especially by the fact that the inlet area 14 and the outlet area 34 of the exhaust gas flow duct 12 are located in approximately the same axial end area. The connection to other exhaust gas-carrying and exhaust gas-treating components of an exhaust gas treatment assembly unit or of an exhaust system can then be established in this end area. This will be described below with reference to FIGS. 4 and 5.

Figure 4:
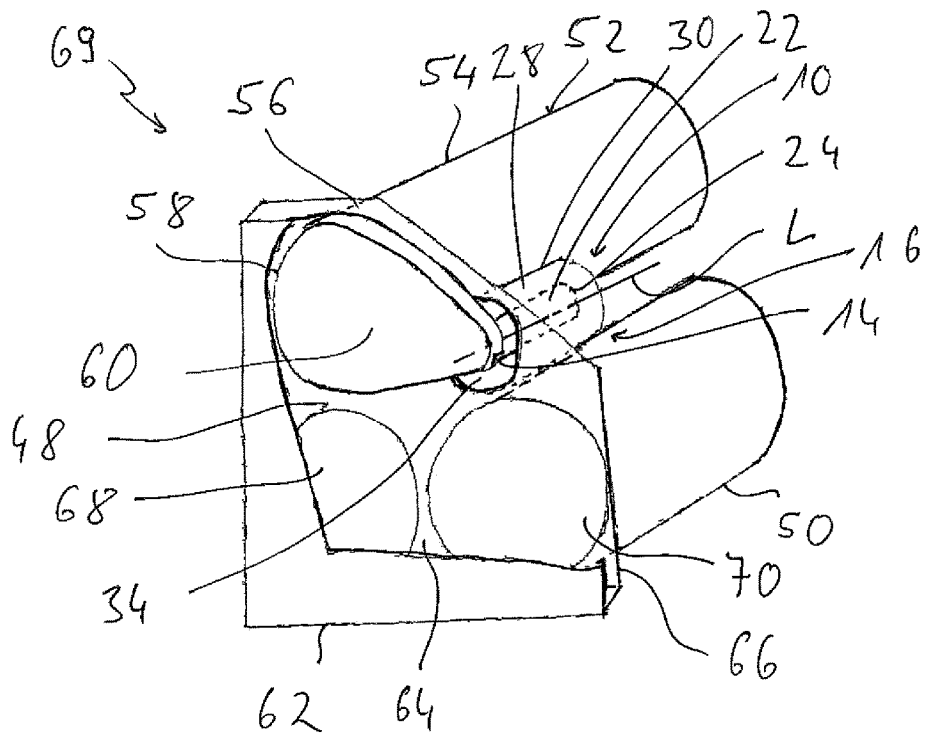
FIG. 4 is a perspective partially cut away view of an exhaust gas treatment assembly unit with an assembly unit according to FIG. 1.

FIG. 4 shows an exemplary embodiment, in which an exhaust gas/reactant mixing assembly unit 10, as it was described above with reference to FIG. 1 through FIG. 3, in conjunction with two SCR catalytic converter units 48, 50 arranged downstream in relation to the exhaust gas/reactant mixing assembly unit and with an assembly unit 52 comprising an oxidation catalytic converter unit and a particle filter device. This assembly unit 52, which is likewise accommodated, for example, in an essentially cylindrical housing 54, is arranged upstream in relation to the exhaust gas/reactant mixing assembly unit 10 and is located approximately next to or overlapping the exhaust gas/reactant mixing assembly unit 10 in relation to the central longitudinal axis L. An outlet area 56 of the assembly unit 52 is located approximately in the same axial area as the inlet area 14 of the exhaust gas flow duct 12 of the exhaust gas/reactant mixing assembly unit 10. An exhaust gas guide element 58 provides a receiving flow chamber generally designated by 60, in which the exhaust gas leaving the assembly unit 52 at the outlet area 56 thereof is guided radially inwardly to the inlet area 14 of the exhaust gas flow duct 12. As was described above with reference to FIG. 1, the exhaust gas stream, already mixed with reactant R, enters from there the first mixing section segment 22 and from this the second mixing section segment 28. The outlet area 34 of the exhaust gas flow duct 12 may be formed, for example, by an axially open, ring-shaped end of the second mixing section segment 28, in which the mixing section 16 is open towards a releasing flow chamber 64 formed in a flow guide housing 62. The exhaust gas/reactant mixing assembly unit 10, just like the assembly unit 52 and the two SCR catalytic converter units 48, 50, may be carried on the flow guide housing 62. For example, the second ring wall 30 may be connected to a wall 66 of the flow guide housing 62.

The two SCR catalytic converter units 48, 50 are also open to the releasing flow chamber 64, so that exhaust gas leaving at the outlet area 34 of the exhaust gas flow duct 12 is deflected radially outwardly in relation to the central longitudinal axis L and can flow to respective inlet areas 68, 70 of the SCR catalytic converter units 48, 50.

A compact arrangement of the exhaust gas treatment assembly unit 69 is obtained due to the arrangement shown in FIG. 4 with the exhaust gas/reactant mixing assembly unit 10, with the assembly unit 52, with the two SCR catalytic converter units 48, 50, with the exhaust gas flow housing 62 and with the flow guide element 58 arranged, for example, essentially in the releasing flow chamber 64.

Figure 5:
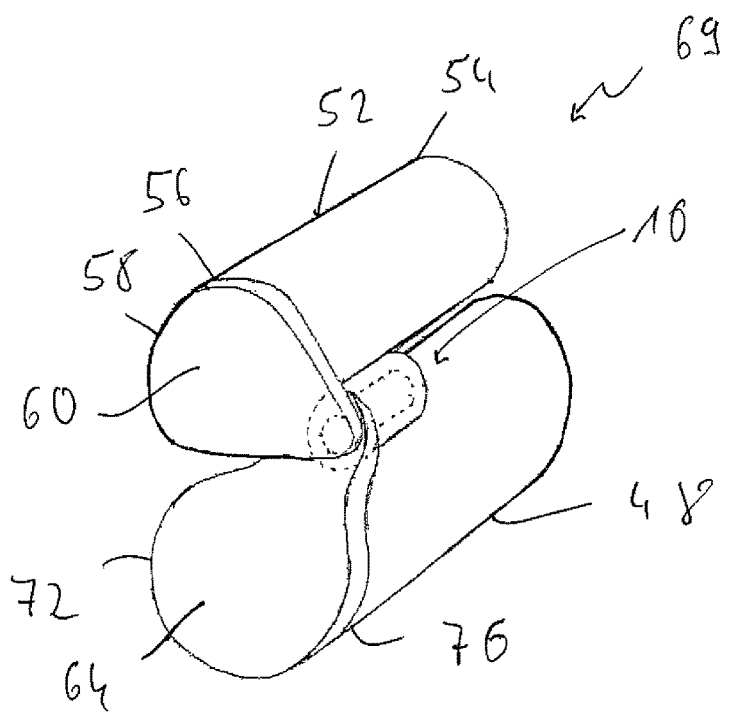
FIG. 5 is a perspective view corresponding to FIG. 4 of an alternative type of configuration.

An alternative embodiment is shown in FIG. 5. Only a single SCR catalytic converter unit 48 is provided in the embodiment of an exhaust gas treatment assembly unit 68 shown in FIG. 5 in addition to the exhaust gas/reactant mixing assembly unit 10 and the assembly unit 52 with the catalytic converter unit and with the diesel particle filter device. The assembly unit 52 is connected via the exhaust gas guide element 58 already explained with reference to FIG. 4 to the receiving flow chamber 60 formed therein to the exhaust gas/reactant mixing assembly unit 10. The SCR catalytic converter unit 48 is connected via a corresponding exhaust gas guide element 72 to the releasing flow chamber 64 formed therein to the outlet area 34 of the mixing section 16. Consequently, an arrangement is selected here, in which separate exhaust gas guide elements, which are not arranged nested one into another, are provided for the flow guiding from and to the exhaust gas/reactant mixing assembly unit 10.

Figure 6:
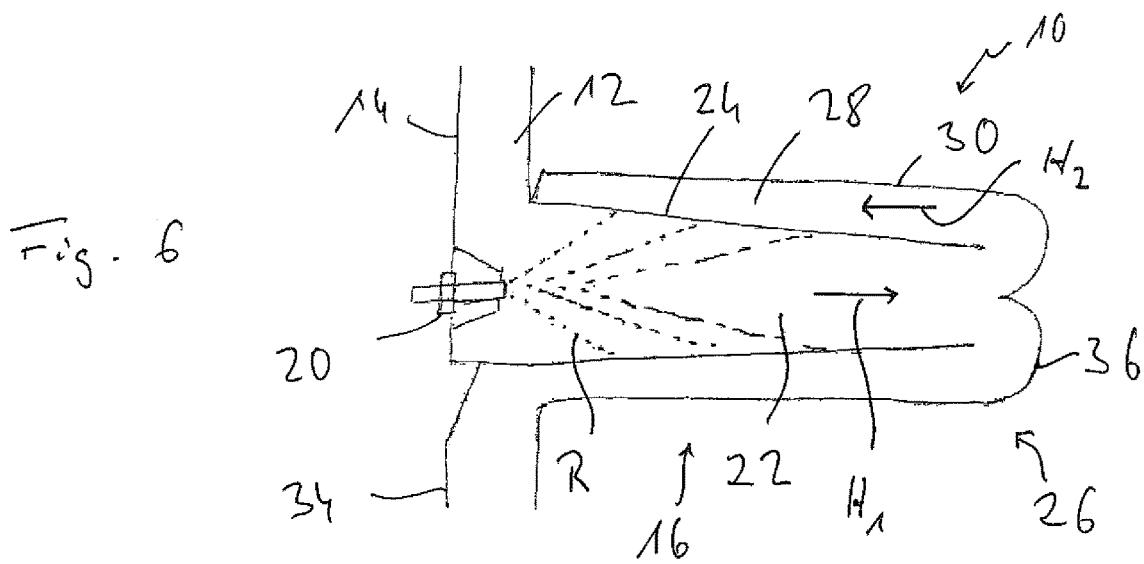
FIG. 6 is a schematic longitudinal sectional view corresponding to FIG. 1 of an alternative type of configuration of an exhaust gas/reactant mixing assembly unit.
Figure 7:
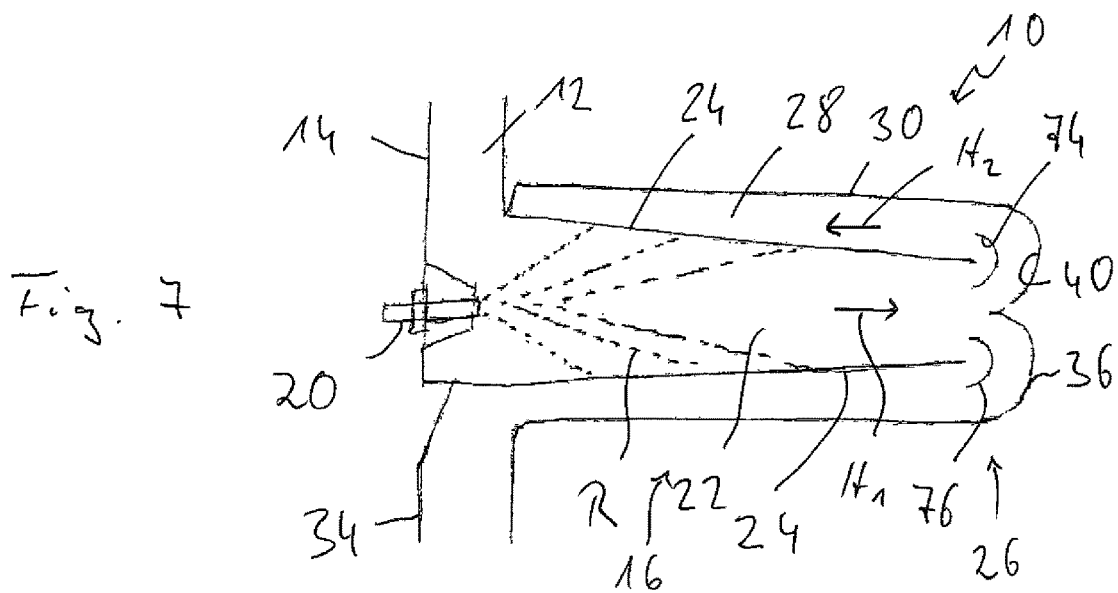
FIG. 7 is a schematic longitudinal sectional view corresponding to FIG. 1 of an alternative type of configuration of an exhaust gas/reactant mixing assembly unit.
Figure 8:
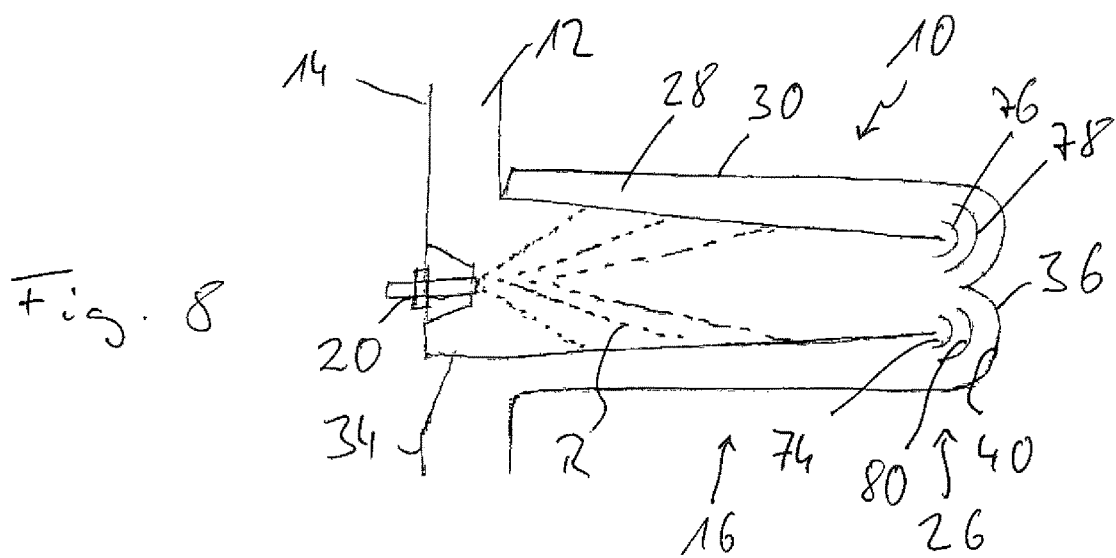
FIG. 8 is a schematic longitudinal sectional view corresponding to FIG. 1 of an alternative type of configuration of an exhaust gas/reactant mixing assembly unit.

FIGS. 6 through 8 show additional alternative configurations of an exhaust gas/reactant mixing assembly unit 10. Components and system areas that correspond to above-described components and system areas are designated by the same reference numbers here.

In the type of configuration shown in FIG. 6, the first ring wall 24, which defines the first mixing section segment 22 radially outwardly and the second mixing section segment 28 radially inwardly, is configured such that the cross-sectional area of the first mixing section segment 22 decreases in the first main flow direction H1. Contrary to the cylindrical shape recognizable in the type of configuration according to FIG. 1, the first ring wall 24 may have, for example, a conical shape.

Such a tapering of the first ring wall 24 and of the first mixing section segment 22 formed therein, for example, with a tapering angle in the range of 1° to 5° and preferably 1° to 3°, formed between the first ring wall 24 and the central longitudinal axis L, causes the reactant R released from the reactant release device 20 to reach the inner surface of the first ring wall 24 with a steeper angle. This supports the wetting of the inner surface of the first ring wall 24 with the reactant R and thus the thermal interaction of the reactant R with the first ring wall 24. Further, the decreasing flow cross section of the first mixing section segment, which likewise compensates the cooling of the exhaust gas flowing therein, leads to an increasing flow velocity, as a result of which the velocity at which the reactant film is moved on the surface of the first ring wall 24 will also increase and a further improvement of the thermal interaction is thus achieved. This effect is especially efficient, particularly when the exhaust gas stream is introduced as a swirling flow into the first mixing section segment 22. A decreasing cross-sectional dimension of the first ring wall 24 leads to an increased flow velocity of the exhaust gas stream flowing as a swirling flow along the first main flow direction H1 due to the angular momentum conservation.

It is further seen in FIG. 6 that the ring wall 30 defining the second mixing section segment 28 radially outwardly may be configured essentially cylindrically in a manner corresponding to the configuration according to FIG. 1. The consequence of this is that the flow cross section of the ring-shaped flow volume decreases in the second main flow direction H2 in the second mixing section segment 28 as well, and a corresponding effect can be achieved, as it was explained above with reference to the flow in the first mixing section segment 22.

FIG. 7 shows a variant of the type of configuration shown in FIG. 6, which may likewise be provided in the configuration shown in FIG. 1 with cylindrical first ring wall 24 as well. A guide element, which has, for example, a ring-shaped or torus-shaped configuration and which provides a likewise curved deflecting surface 74, is provided in the deflection area 26 between the axial end of the first ring wall 24 and the deflecting element 36. This guide element may be carried via webs, for example, on the inner circumference of the deflecting element 36 or/and of the second ring wall 30, and it supports the deflection of the exhaust gas stream leaving the first mixing section segment 22 close to the inner surface of the first circumferential wall 24 to flow into the second mixing section segment 28. Since the guide element 76 is also heated by this exhaust gas stream flowing around, this also provides a hot surface supporting the evaporation and thermal decomposition of the reactant. Further, the development of pressure losses in the area of the deflection area 26 is prevented by the uniform deflection.

Two such guide elements 76, 78 are arranged in the type of configuration shown in FIG. 8 following each other in the direction of the central longitudinal axis L between the axial end of the first ring wall 24 and the deflecting element 36, so that a further improvement of the deflecting effect, on the one hand, and, on the other hand, a further enlargement of the surface for the thermal interaction of the reactant R and of the components generated therefrom and exhaust gas-carrying components are achieved. Since all guide elements 76. 78, as well as the deflecting element 36, provide each a, for example, circularly curved deflecting surface 74, 80, 40, uniform flow guiding is also achieved in the area in which the main flow direction is reversed by about 180°.

A marked enlargement of the surface available for the thermal interaction with the reactant is achieved with the configuration according to the present invention of an exhaust gas/reactant mixing assembly unit with an overall size that is markedly reduced compared to a linear flow guiding or a U-shaped flow guiding. For example, the enveloped construction volume can thus be reduced by nearly 50% compared to an elongated, linear flow guiding at equal heat transfer surface. The overall axial length can also be reduced to a corresponding extent. At the same time, the heat loss to the outside is markedly reduced due to the nesting of mixing section segments in one another, so that the heat transported in the exhaust gas can be used substantially more efficiently for the evaporation and the thermal decomposition of the reactant. The flow conditions occurring in the interior of such a nested arrangement also lead to a markedly more efficient wetting of the surface available for the thermal interaction with the reactant.

Due to the fact that there is a comparatively great flow length in the mixing section even with a compact configuration, it is also possible, in principle, to eliminate the need for a mixer, which has a plurality of flow-deflecting guide surfaces, which thus ensure swirling, so that the risk of formation of deposits in the area of such a mixer can be eliminated as well. Should it nevertheless be advantageous or necessary to provide a mixer for improved mixing, this could be accommodated, for example, in the interior of the ring wall, i.e., in the first mixing section segment.

It should finally be noted that different above-described embodiment variants may, of course, also be combined with one another. The respective deflection areas may thus, of course, be thermally insulated or/and interact with an electrically energizable heating device in the embodiment variants shown in FIGS. 6 through 8 as well. The second ring wall defining the mixing section radially outwardly could, in principle, be covered with heat insulating material as well. The ring walls and the mixing section segments formed therein preferably have a round, for example, circular, oval or elliptical cross-sectional geometry for the most uniform flow guiding possible, regardless of whether a cylindrical or tapering shape is selected. Other embodiments may be provided with other cross-sectional geometries, e.g., cross-sectional geometries that are angular in at least some areas, and walls nested in one another.

While specific embodiments of the invention have been shown and described in detail to illustrate the application of the principles of the invention, it will be understood that the invention may be embodied otherwise without departing from such principles.

What is claimed is:

1. An exhaust gas treatment assembly unit for an exhaust system of an internal combustion engine, the exhaust gas treatment assembly unit comprising:
   at least one SCR catalytic converter unit;
   an assembly unit accommodated in a housing and comprising an oxidation catalytic converter unit or a particle filter device or both an oxidation catalytic converter unit and a particle filter device;
   an exhaust gas/reactant mixing assembly unit comprising:
      an exhaust gas flow duct with an inlet area and a mixing section extending along a central longitudinal axis; and
      a reactant release device for releasing reactant into exhaust gas flowing in the exhaust gas flow duct, wherein the mixing section comprises:
         a first mixing section segment downstream of the reactant release device, an exhaust gas/reactant mixture flowing in the first mixing section segment in a first main flow direction along the central longitudinal axis in the direction from the reactant release device toward a deflection area; and
         a second mixing section segment having a ring configuration surrounding the first mixing section segment, the exhaust gas/reactant mixture flowing in the second mixing section segment from the deflection area to an outlet area of the exhaust gas flow duct in a second main flow direction opposite the first main flow direction,
   wherein the at least one SCR catalytic converter unit is provided downstream of the exhaust gas/reactant mixing assembly unit, an inlet area of the at least one SCR catalytic converter unit and the outlet area of the exhaust gas flow duct of the exhaust gas/reactant mixing assembly unit being located in a same axial area, the outlet area of the exhaust gas flow duct being open towards a releasing flow chamber guiding the exhaust gas/reactant mixture from the outlet area of the exhaust gas flow duct radially outwardly in relation to the central longitudinal axis to the inlet area of the at least one SCR catalytic converter unit,
   wherein the assembly unit is provided upstream of the exhaust gas/reactant mixing assembly unit, an outlet area of the assembly unit being open towards a receiving flow chamber and the inlet area of the exhaust gas flow duct being open towards the receiving flow chamber, such that exhaust gas flows in the receiving flow chamber radially inwardly in relation to the central longitudinal axis, wherein the assembly unit and the at least one SCR catalytic converter unit are located next to and axially overlapping each other and the exhaust gas/reactant mixing assembly unit.

2. The exhaust gas treatment assembly unit in accordance with claim 1, wherein:
   the at least one SCR catalytic converter unit comprises at least two SCR catalytic converter units; and
   the inlet areas of the at least two SCR catalytic converter units are open towards the releasing flow chamber.

3. The exhaust gas treatment assembly unit in accordance with claim 1, wherein the receiving flow chamber and the releasing flow chamber are arranged in a same axial area of the mixing section.

4. The exhaust gas treatment assembly unit in accordance with claim 1, wherein the exhaust gas flow duct comprises a first ring wall extending along the central longitudinal axis, the first ring wall defining the first mixing section segment radially outwardly in relation to the central longitudinal axis and separates the first mixing section segment from the second mixing section segment.

5. The exhaust gas treatment assembly unit in accordance with claim 4, wherein the first ring wall has a cylindrical configuration in an area of a longitudinal extension thereof.

6. The exhaust gas treatment assembly unit in accordance with claim 4, wherein the first ring wall has a conical configuration with decreasing cross-sectional dimension in an entire area of a longitudinal extension thereof.

7. The exhaust gas treatment assembly unit in accordance with claim 6, wherein a slope angle of the first ring wall in relation to the central longitudinal axis is in the range of 1° to 5°.

8. The exhaust gas treatment assembly unit in accordance with claim 4, wherein the exhaust gas flow duct comprises a second ring wall extending along the central longitudinal axis and defining the second mixing section segment, radially outwardly in relation to the central longitudinal axis.

9. The exhaust gas treatment assembly unit in accordance with claim 8, wherein the second ring wall has a cylindrical configuration in an entire area of an extension thereof along the central longitudinal axis.

10. The exhaust gas treatment assembly unit in accordance with claim 8, wherein the deflection area comprises a deflecting element adjoining the second ring wall in an outer circumferential area of the deflecting element.

11. The exhaust gas treatment assembly unit in accordance with claim 10, wherein the deflecting element comprises a rotationally symmetrical, curved deflecting surface in relation to the central longitudinal axis.

12. The exhaust gas treatment assembly unit in accordance with claim 4, wherein the first ring wall has a bead shaped expansion in an end area located adjacent to the deflection area.

13. The exhaust gas treatment assembly unit in accordance with claim 1, further comprising at least one ring-shaped guide element provided in the deflection area, the at least one ring-shaped guide element forming a curved deflecting surface.

14. The exhaust gas treatment assembly unit in accordance with claim 1, further comprising an electrically energizable heating device heating a wall defining the exhaust gas duct in the deflection area.

15. The exhaust gas treatment assembly unit in accordance with claim 1, further comprising insulating material, wherein a wall defining the mixing section outwardly is covered, in the deflection area, with the insulating material, on a side facing away from the exhaust gas flow duct.

16. The exhaust gas treatment assembly unit in accordance with claim 1, wherein the first mixing section segment is radially expanded in an end area located adjacent to the deflection area in relation to the first main flow direction.

17. The exhaust gas treatment assembly unit in accordance with claim 1, wherein the inlet area and the outlet area of the exhaust gas flow duct are arranged in a same axial area of the mixing section.

18. The exhaust gas treatment assembly unit in accordance with claim 1, wherein a flow cross-sectional area in the area of the second mixing section segment is larger than or equal to a flow cross-sectional area in the areas of the first mixing section segment.

19. The exhaust gas treatment assembly unit in accordance with claim 1, wherein the inlet area of the exhaust gas flow duct is configured to generate a swirling flow in the first mixing section segment.

20. An exhaust gas/reactant mixing assembly unit for an exhaust system of an internal combustion engine, the exhaust gas/reactant mixing assembly unit comprising:
- an exhaust gas/reactant mixing assembly unit structure comprising:
  - an exhaust gas/reactant mixing assembly unit longitudinal axis;
  - an exhaust/gas reactant mixing assembly unit first end portion;
  - an exhaust/gas reactant mixing assembly unit second end portion located axially opposite the exhaust/gas reactant mixing assembly unit first end portion with respect to the exhaust gas/reactant mixing assembly unit longitudinal axis;
  - an exhaust gas flow duct structure comprising an exhaust gas flow duct structure inlet area, an exhaust gas flow duct structure outlet area, a deflection area and a mixing section, the exhaust gas flow duct structure inlet area and the exhaust gas flow duct structure outlet area being located at the exhaust/gas reactant mixing assembly unit first end portion, the deflection area being located at the exhaust/gas reactant mixing assembly unit second end portion, the mixing section extending along the exhaust gas/reactant mixing assembly unit longitudinal axis; and
- a reactant release device for releasing reactant into exhaust gas flowing in the exhaust gas flow duct, wherein the mixing section comprises:
  - a first mixing section segment downstream of the reactant release device, wherein the first mixing section segment defines a first exhaust gas/reactant mixture flow path portion extending in a first main flow direction along the exhaust gas/reactant mixing assembly unit longitudinal axis from the reactant release device toward the deflection area; and
  - a second mixing section segment having a ring configuration surrounding the first mixing section segment, the second mixing section segment defining a second exhaust gas/reactant mixture flow path portion for the delivery of an exhaust gas/reactant mixture towards the exhaust gas flow structure outlet area, the second exhaust gas/reactant mixture flow path portion extending from the deflection area to the exhaust gas flow duct structure outlet area in a second main flow direction, the second main flow direction being opposite the first main flow direction, wherein the exhaust gas flow duct structure comprises a first ring wall extending along the exhaust gas/reactant mixing assembly unit longitudinal axis, the first ring wall defining the first mixing section segment radially outwardly in relation to the exhaust gas/reactant mixing assembly unit longitudinal axis and separating the first mixing section segment from the second mixing section segment, the first ring wall having a conical configuration with decreasing cross-sectional dimension in an entire area of a longitudinal extension thereof.

\* \* \* \* \*